(12) United States Patent
Brunn et al.

(10) Patent No.: US 8,122,432 B2
(45) Date of Patent: Feb. 21, 2012

(54) RULE MANAGEMENT USING A CONFIGURATION DATABASE

(75) Inventors: Jonathan F. Brunn, Durham, NC (US); Clayton P. Coleman, Durham, NC (US); Troy A. Howard, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1510 days.

(21) Appl. No.: 11/538,681

(22) Filed: Oct. 4, 2006

(65) Prior Publication Data
US 2008/0086717 A1 Apr. 10, 2008

(51) Int. Cl.
*G06F 9/45* (2006.01)
(52) U.S. Cl. ....................................................... 717/117
(58) Field of Classification Search .................... 717/117
See application file for complete search history.

(56) References Cited

U.S. PATENT DOCUMENTS

| | | | | |
|---|---|---|---|---|
| 5,423,041 A * | 6/1995 | Burke et al. | .................. | 717/117 |
| 5,551,030 A * | 8/1996 | Linden et al. | .......................... | 1/1 |
| 6,081,786 A * | 6/2000 | Barry et al. | ....................... | 705/3 |
| 7,006,980 B1 * | 2/2006 | Snyder | .......................... | 705/7.37 |
| 7,346,561 B1 * | 3/2008 | Devitt et al. | ............... | 705/26.61 |
| 7,899,732 B2 * | 3/2011 | Van Beaumont et al. | ....... | 705/37 |
| 7,916,755 B2 * | 3/2011 | Hasek et al. | ................... | 370/486 |
| 2002/0023051 A1 * | 2/2002 | Kunzle et al. | .................... | 705/38 |
| 2005/0022207 A1 * | 1/2005 | Grabarnik et al. | ............. | 719/313 |
| 2005/0108625 A1 * | 5/2005 | Bhogal et al. | .................. | 715/505 |
| 2007/0094199 A1 * | 4/2007 | Deshpande et al. | ............. | 706/47 |
| 2007/0288412 A1 * | 12/2007 | Linehan | .......................... | 706/45 |

OTHER PUBLICATIONS

Ahmed Abulsorour et al. "Business Process Automation Made Easy With Java, Part 1," www.javaworld.com/javaworld/jw-09-2002/jw-0906-process_p.html, Sep. 2002, 9pgs.
Ahmed Abulsorour et al. "Business Process Automation Made Easy With Java, Part 2,", www.javaworld.com/javaworld/jw-10-2002/jw-1018-process2_p.html, Oct. 2002.
"Enterprise Decision Management: Blaze Advisor—Business Rules Management Software from Fair Isaac," www.fairisaac.com/Fairisaac/Solutions/Enterprise+Decision+Management/Business+Rules/Blaze+Advisor/, 2 pgs.
"ILOG JRules," www.ilog.com/products/jrules/, Jun. 28, 2006, 2pgs.

* cited by examiner

*Primary Examiner* — John Chavis
(74) *Attorney, Agent, or Firm* — Law Office of Jim Boice

(57) ABSTRACT

A method is presented that enables custom applications to embed rule authoring capabilities. In one embodiment, the method includes: imbedding a rule picker into an existing software application; presenting a choice of rules to be implemented in the existing software application, wherein a business vocabulary context defines and limits the choice of rules that is presented; and integrating a selected rule, from the choice of rules, into the existing software application. The business vocabulary context may be determined by a business vocabulary of the existing software application, wherein the business vocabulary is composed of software objects that describe a current session of the existing software application. The business vocabulary context may be defined as a name of a category that is passed to a rule creation engine by a rule picker in an Integrated Development Environment (IDE), such that a rule picker tag may be rendered in the IDE.

20 Claims, 14 Drawing Sheets

FIG. 6

☐ Personalization Element

* Name: /select content modified this month
Title: select content modified this month
Desciption: None
Author: None
Date modified: June 14, 2006 10:10:31 pm EDT
* Results per page:
10
Header:

[Import] [Export] [Insert Link] [Insert Image]

[Search] [Open] [Clear]

RULE MANAGEMENT USING A CONFIGURATION DATABASE

BACKGROUND OF THE INVENTION

The present invention relates in general to the field of computers and other data processing systems, including hardware, software and processes. More particularly, the present invention pertains to the management of the resources of such a system using rules and/or policies. Still more particularly, the present invention enables custom applications to embed rule authoring capabilities.

Most efforts to integrate rules engines (such as the design options for rule engine integration described in "Business Process Automation Made Easy With Java, Part 2," by Ahmed Abulsurour and Siva Visveswaran, and accessible at http://www.javaworld.com/javaworld/jw-10-2002/jw-1018-process2.html), focus on the runtime aspects of integration. Note also that "Business Process Automation Made Easy With Java, Part 1," also by Ahmed Abulsurour and Siva Visveswaran, and accessible at http://www.javaworld.com/javaworld/jw-09-2002/jw-0906-process.html, shows external components communicating with the rule engine at runtime, but does not discuss integration between the application where the rule will be invoked and the rule authoring environment.

Another prior art document on rule editing is found at http://www.fairisaac.com/Fairisaac/Solutions/Enterprise+Decision+Management/Business+rules/Blaze+Advisor/, which describes highlights of "Blaze Advisor" from Fair Isaac Corporation. This document mentions that rule editing is part of an "integrated development environment," but does not discuss how rule authoring may be embedded in an application such as Lotus Notes™, Lotus Domino™ (both from International Business Machines, Inc.), or an expense payroll application, at least not without constructing custom forms as mentioned in the documentation.

JRules™, from ILOG, Inc., also integrates its rule editing capabilities in an integrated development environment such as "Rule Studio" (see http://www.ilog.com/products/jrules/), instead of surfacing those rule editing capabilities through the end user application.

Many existing business rules engines provide a standalone user interface for authoring rules or integrate those rule editing capabilities into an IDE. To use such an application, however, the business rule author must leave the application to which the rules apply and go to an Integrated Development Environment (IDE) or standalone rule administration page.

More recently, the business rule author is a policy author writing rules to codify policies. In this case, to author a policy rule, the user must exit the application to which the policy applies. For instance, the business user may be writing a rule to decide what travel expenses must be sent to a manual authorization process. The business user must leave the expense administration application and use a business rules application to administer the rules guiding this policy. At best, a link is provided to the rule administration User Interface (UI) from the expense administration UI.

Other systems have used custom built embedded rule capabilities, such as rule-based routing of mail to folders. While this capability is part of the mail application, it is not part of a general purpose rules engine. Thus, rules written in the mail application cannot easily be re-used by other applications.

Some previous rule engine implementation have allowed for projects. A project could include the definitions of business vocabulary. However, this does not allow for multiple applications which might cooperate in a single project sharing parts of the business vocabulary. For instance, web content rules may exist in the same project as rules for portal navigation, each using different business vocabulary. While some applications might have overlapping business vocabulary, if a rule includes conditions dependant on attributes of the content, then that rule would not be available to use in policies of different applications. Using a project based approach completes segments rules and minimizes any value gained from a common rule infrastructure. Aside from projects, another possible implementation is to have multiple instances of the rule editor/rule engine, each configured with different available objects. Again, this approach completely segments the rules and minimizes any benefit from a common infrastructure.

Some rule engines require the user to explicitly state the input and output of a rule type. By specifying the input and output when defining the rule type, these implementations fix a set of allowed business vocabulary for a given rule type, not allowing it to be customized based on the application using the rule type or the context of the rule being invoked. They also require the author of the rule to know what inputs and output will be available when the rule is executed.

While the concept of a rule mapping, or an association between a rule and a place that rule is used, is known in the prior art, the concept of allowing a calling application to manage the rule mapping without indirection (e.g., through the use of content spots or "point of variability—pov") is heretofore unknown.

SUMMARY OF THE INVENTION

The present invention provides a computer-implementable method, system and computer medium that enable custom applications to embed rule authoring capabilities. In one embodiment, the computer-implementable method includes: imbedding a rule picker into an existing software application; presenting a choice of rules to be implemented in the existing software application, wherein a business vocabulary context defines and limits the choice of rules that is presented; and integrating a selected rule, from the choice of rules, into the existing software application. The business vocabulary context may be determined by a business vocabulary of the existing software application, wherein the business vocabulary is composed of a set of types of software objects which are available when the rules are executed within the context or session of the existing software application. In one embodiment, the method further includes the steps of: creating a new rule that comports with the business vocabulary context in the existing software application; categorizing the new rule as a categorized new rule; and storing the categorized new rule in a rule repository that is accessible to the existing software application. The business vocabulary context may be defined as a name of a category to which a set of types of business objects are assigned, wherein the category name is passed to the rule picker by the calling application, such that a rule picker tag may be rendered appearing to be a part of the calling application, wherein the rule picker tag presents an option to create a new rule, and wherein the rule picker tag is a Java Server Page (JSP) tag found in a JSP file that rendered the existing software application The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIGS. 6-7 illustrate different displays of exemplary rules that may be embedded in a preexisting application in accordance with the present invention, and are representative of block 212 in FIG. 2;

FIG. 8 depicts a Uniform Resource Locator (URL) link available in one embodiment to access rule customizing pages, and is representative of an implementation of block 210 in FIG. 2;

DETAILED DESCRIPTION OF THE PREFERRED EMBODIMENT

Figure 1:
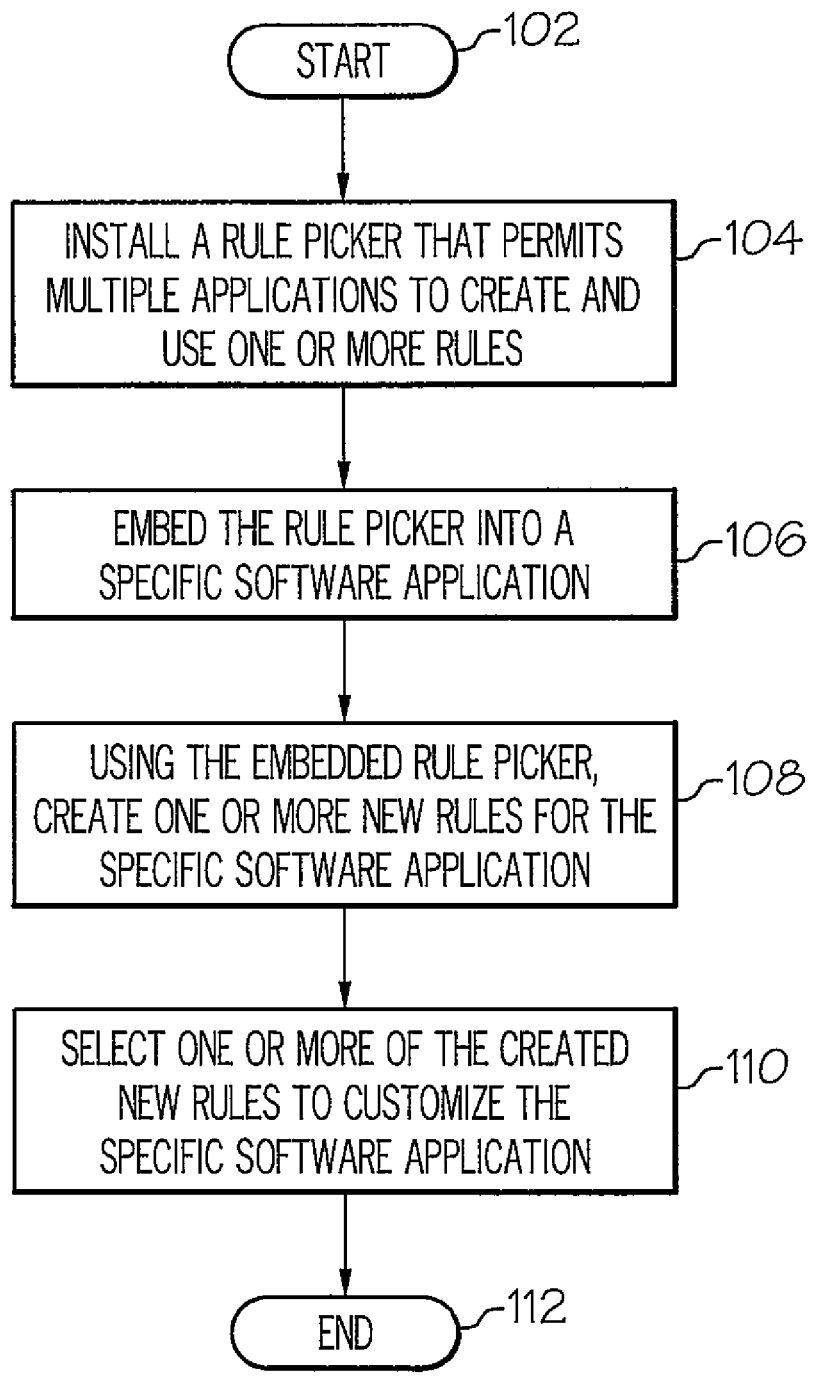
FIG. 1 is a flow-chart of exemplary steps taken to embed a rule picker into an existing application.

The present invention uses a JavaServer Page (JSP) tag library to offer integration with a rule editor and rule engine. A JSP tag allows authoring and selection of business rules which can be embedded in another application. When a rule is selected using pages rendered by links rendered by the tag, the id is communicated back to the calling application and the calling application must store the reference to the rule for later use. This allows for late binding of the rule to its place of invocation without the addition of an artificial "content spot" concept. Instead of binding rules to content spots which represent the place where the rule is executed to the rules engine, you bind the rules directly to the place where it is executed. The invention is particularly novel in how it uses JSP tags, interportlet communication and content repository concepts like categorization to achieve this goal.

The JSP tag allows the rule editing capabilities to be customized for a particular invocation by specifying a set of "business vocabulary" that can be used in a particular invocation. Allowing the application to specify business vocabulary on the invocation of the editor allows a single rule tag to be used by multiple applications. Categories in the content repository are used to reference business vocabulary so that new business vocabulary may be added without modifying the rule editor or tag. The application does not communicate the set of business vocabulary directly, but instead can reference a category of business vocabulary.

The approach has the advantage that the application of the rule, which logically determines which business vocabulary make sense at runtime, also determines what vocabulary is available in the rule editor, but that vocabulary is also extensible by other applications (by adding to the categories and assigning new elements to existing categories). Categories are marked with metadata in the repository indicating if they are inclusive or exclusive. Inclusive categories designate a specific business vocabulary which should be made available in the rule editor. Exclusive categories designate all known business vocabulary except those in the category should be made available in the rule editor. Categories are typically hierarchical in a content repository, and this invention makes use of that hierarchy. A category may be a subcategory. In this case, the business vocabulary of the parent category is also excluded or included depending on whether the category is exclusive or inclusive.

Another advantage of the application (Web Content Management, Policy, Portal Admin) controlling the association of the rule to the place it is invoked is in access control. The calling application can now manage the access control of who is allowed to make certain rule mappings. Previously this would have required access control to be manually set on a content spot definition in Personalization, so it could not easily be a side affect of some other access control being set in the calling application. For instance, in the Portal Administration case, the right to assign a rule to a page is determined by the user's access level on the page, not on an access level on an artificial "content spot" object created only for the purpose of having a place to map to. In many rule engines this level of access control is simply not available, such as in Process Server™.

With reference now to the figures, and in particular to FIG. 1, a flow-chart is presented showing a high-level overview of exemplary steps taken to utilize an embedded rule picker to customize an existing application. After initiator block 102, a rule picker is installed (block 104). This rule picker permits multiple applications to create and use one or more rules. Additional details describing the rule picker are presented below. As described in block 106, this rule picker is embedded into a specific (and pre-existing) software application. This step described in block 106 may involve defining new types of business objects and assigning business objects to preexisting or new categories. As described more fully below, this embedded rule picker is subsequently used to create and/or edit rules for the application in which the rule picker is embedded (block 108). Using pop-ups, drop-down menus, and other presented features enabled by the rule picker, one or more rules are created/selected to customize the specific software application (block 110). The process ends at terminator block 112.

Figure 2:
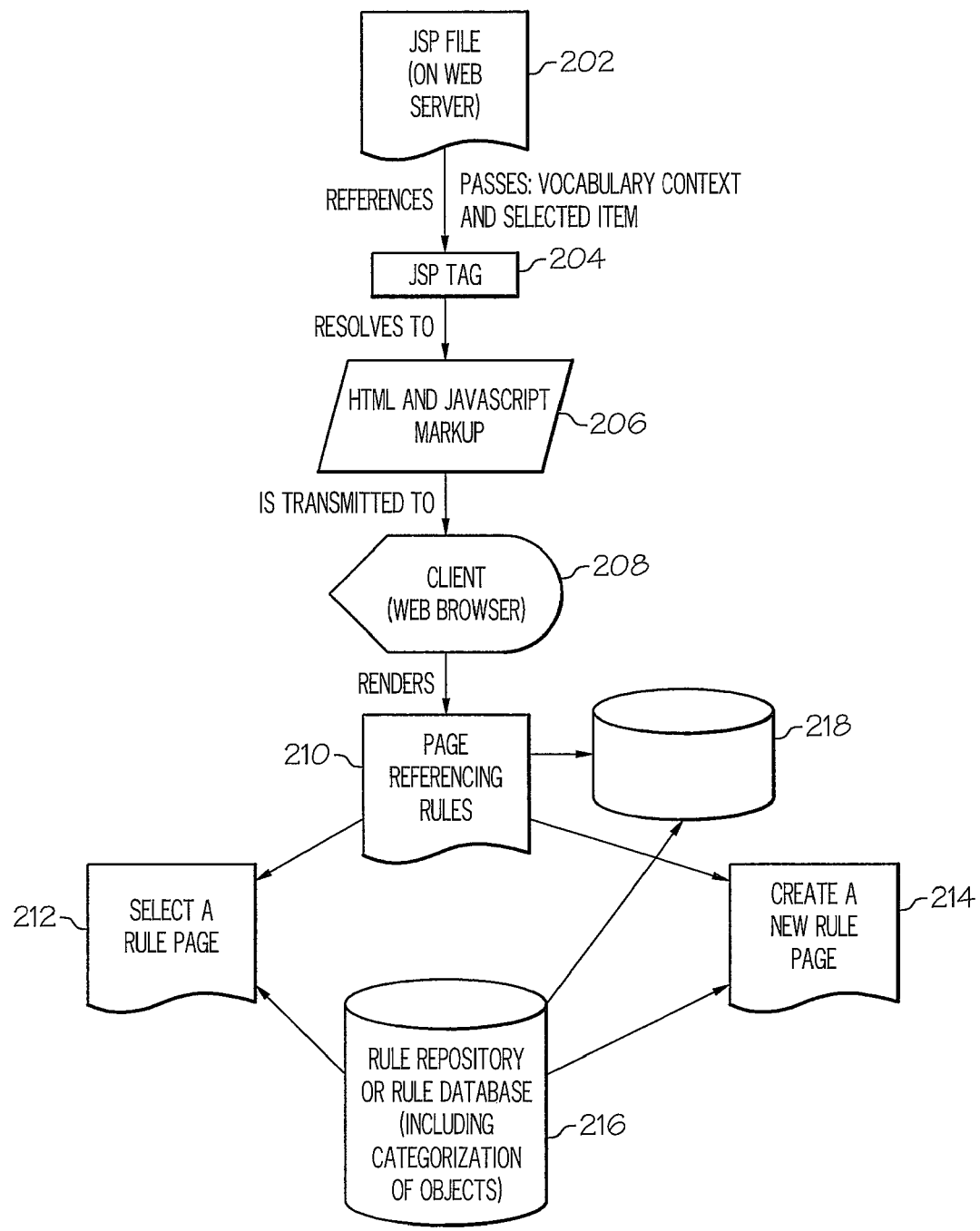
FIG. 2 illustrates additional detail of the steps described in FIG. 1.
Figure 7:

Referring now to FIG. 2, additional detail is presented on how rules are created in accordance with the present invention. A Java Server Page (JSP) file 202 references a JSP tag 204 by passing vocabulary context (e.g. a category designating a set of types of business objects.) and optionally a selected item (rule). The JSP tag 204 resolves to HyperText Markup Language (HTML), Javascript™, or similar markup 206, which is transmitted to a browser 208, which renders a page 210. (Note that the functionality of JSP tag 204 may alternatively be provided by an Application Program Interface—API, which is called to return the HTML or Javascript™ markup 206 directly to some application. In another embodiment, the markup returned may be represented by some other markup language or by XML.) Page 210 is used to reference (create or select) a particular rule for a specific application in which a rule or a reference to a rule is embedded. Page 210, which is part of the application making use of the rule picker JSP tag, then either selects an existing rule (block 212 and FIGS. 6 and 7) or creates a new rule (block 214 and FIGS. 4 and 5). The rules are stored in a rule repository 216, which includes a logical categorization of the stored rules and the logical categorization of types of business objects used in rules. The set of types of business objects may include, but is not limited to, an object representing the current user, an object representing the capabilities of the client or browser, objects representing actions taken by the client, an object representing the date, objects representing settings or configurations of software, and fields of such objects such as the fields of a user's name, time of day, destination of a document, enterprise department of a sending or receiving user, academic class name of authorized users, name of authorized student, administrator's name and/or password, department name or number, location, type of client being used, names or counts of pages visited, etc. When a page 210 selects or creates a new rule, a reference for that rule is stored within a database 218 that is owned by the application in which the rule (or reference to the rule) is embedded. This database may or may not be implemented in the same physical database as the repository 216.

Figure 3:
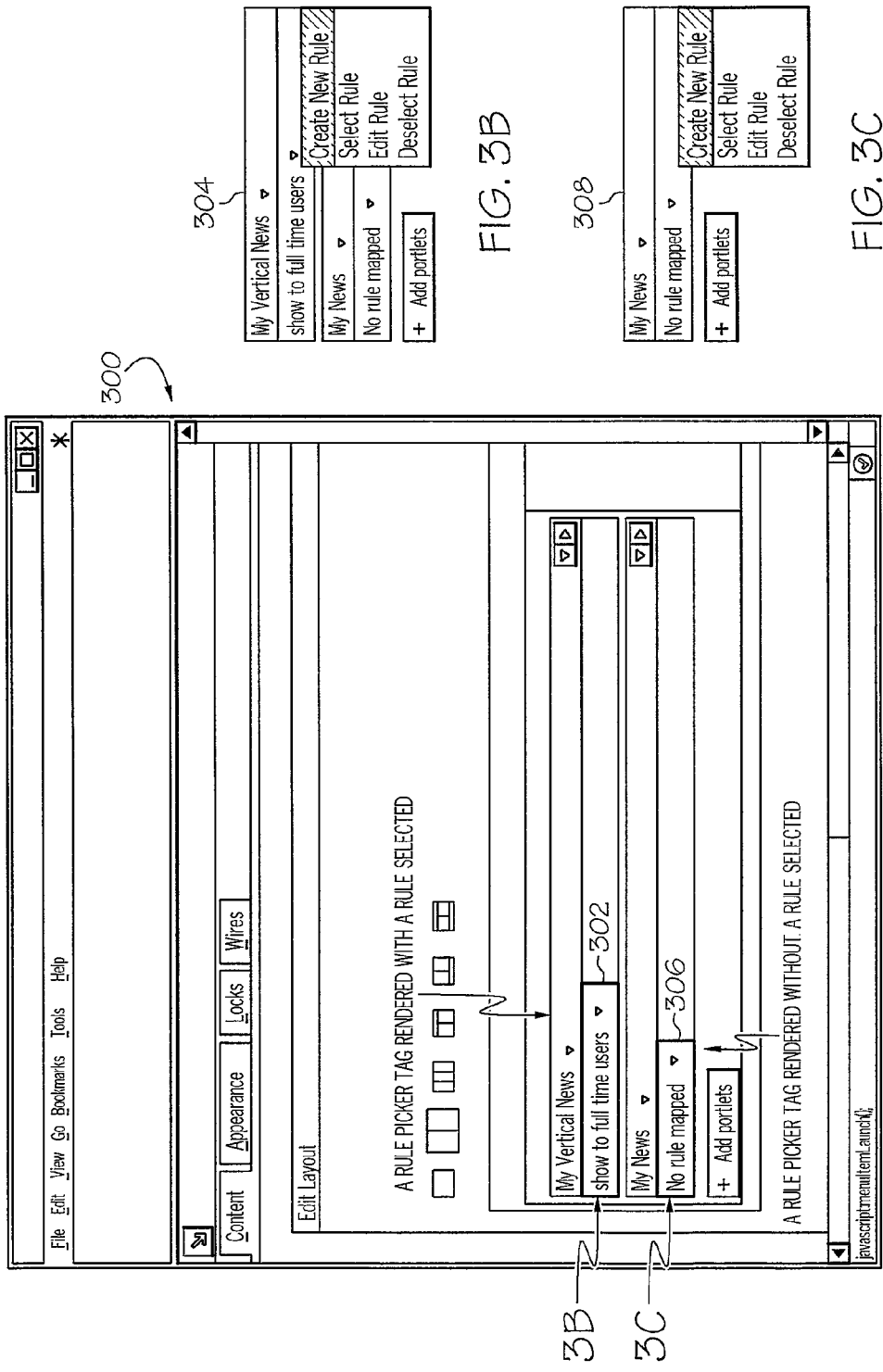
FIG. 3 depicts an exemplary Graphical User Interface (GUI) used in a portal application in which a rule picker is embedded, representative of block 210 in FIG. 2.

An exemplary Graphical User Interface (GUI) 300, which may utilize the present invention, and thus is now used to more fully describe the present invention, is shown in FIG. 3. Depicted is a rule picker tag 302, which has selected a rule, is embedded in a Portal's edit layout page of the GUI 300. The page depicted in FIG. 3 is used to arrange portlets or pieces of web content on a portal page. "My Vertical News" and "My News" are exemplary portlets which can be arranged on the page. By utilizing a JSP tag in the portlet permits the rendering of the rule picker tag 302, and the pages to which menu items are linked. A programmer (application developer) for the Portal software system has used the tag in the administrative console for the Portal system. A business user, in this case an administrator of the Portal, is able to utilize the markup printed to the page by the rule picker tag 302 to edit or deselect the rule that is currently picked by rule picker tag 302. Specifically, rule picker tag 302 shows that the rule "show to full time users" is assigned to a particular portlet, is in effect, and may be edited or deselected through the use of drop-down menu 304. In addition, rule picker tag 302 allows the application developer to create new rules, or to select a different (or additional) rule to be associated with the portlet "My Vertical News."

Rule picker tag 306 shows that there are no rules initially mapped to the portlet "My News." As such, when rule picker tag 306 is activated by the application developer, drop-down menu 308 only presents options to create a new rule (to be associated with the portlet "My News"), or to select a previously created rule (to be associated with the portlet "My News"). The "Create New Rule" option takes the application developer to a rule editor, which is preferably independent of the application currently running ("IBM WebSphere Portal Administration"), such that a single rule editor can be used by multiple applications for embedding rules (or logical references to rules) in other applications. The embedding application passes a parameter called "actionname" to the tag indicating the name of the action or request parameter where it will look for a rule name. Specifying the request parameter or action name on the tag allows an embedding application to contain multiple references to different rule pickers and to be able to distinguish a return from each of the pickers.

The "Select Rule" option takes the application developer to a screen that allows her to select a rule from a list of predefined rules (as shown in exemplary manner in the following figures).

Note that GUI 300 allows an application developer to create a rule (if one that matches the application developer's needs/expectations does not exist). In a default implementation, the "Select Rule" and "Create New Rule" pages that are shown in the following figures are truly new pages that the user is taken to though a request to (or a response from) a web server. In another embodiment, these pages are simply client-side widgets that are presented as an overlay on top of the existing page. In another embodiment, these pages may be a client side application written in any language supported by the operating system and whereby the rule is communicated between the client and server by use of a browser plug-in.

When the application developer returns to GUI 300 (after going to a "Create New Rule" or "Select Rule" page), code embedded in GUI 300 (the edit layout page) receives a message containing the name or identification of the selected rule. The message is sent as a request parameter or Portlet Action or message named with the value passed into the tag using the tag's "actionname" parameter. The edit layout page saves this name or identification so that it will know which rule was selected (as described above in FIG. 2 with reference to page 210 and database 218). Thus, this is the extent to which the invoking application must concern itself with rules (i.e., it need only save the name of the referenced rule). The edit layout page is therefore shielded from the tedium of selecting or creating rules, and can embed "Personalization or Business Rule Capabilities," particularly in rule authoring, without burdening the application developer with rule syntax, rule models, and other constraints found in a typical rules engine.

As described above, the JSP tag (or API) accepts a parameter called "selecteditem" from the page which uses it. In the example shown in FIG. 3, the edit layout page passes the selected item (rule) it has saved previously when the user selected the rule from this screen. Thus, the application "knows" what rule name to render, whether or not to render the deselect rule and edit rule options (when a rule is already associated with the rule picker), and what rule to open when a business user clicks on a rule edit option.

Note that when a rule is selected by rule picker tag 306, the "No rule mapped" text is changed to the name of the rule that was selected by the business user, either by creating a rule or selecting a preexisting rule. In the example shown in FIG. 3, when the down arrow in drop-down menu 308 is clicked, the business user is presented with options to deselect the rule, edit the rule, or create or select a new rule.

Note further that the term "picker" or "rule picker" is understood and defined herein as collectively referring to a JSP tag (or API) used to render this markup, the markup itself, the pages which result from clicking on "Create New Rule," "Select Rule," "Edit Rule," or "Deselect Rule," and the process by which the pages communicate the selected rule with each other.

As used herein, the term "application developer" is intended to describe a person who determines which business contexts can be used for a particular rule picker, and then embed the rule picker into a (preferably) preexisting application. A "business user" is defined as a person who is able to use the rule-picker-embedded preexisting application to manage rules associated with that application. An "end user" is defined as a person who sees a customized application that results from the actions taken by the business user. For example, consider a teacher that wishes for his students to see only certain class notes when they log into the teacher's website. The application developer defines which business objects are available to the teacher ("business user"), who then modifies his webpage, creating and selecting rules such that the students ("end users") can only see those documents that comport with the rules selected or created by the teacher. Of course, this example is for exemplary purposes of illustration only, and should not be construed as limiting the scope or purpose of the present invention.

Figure 4:
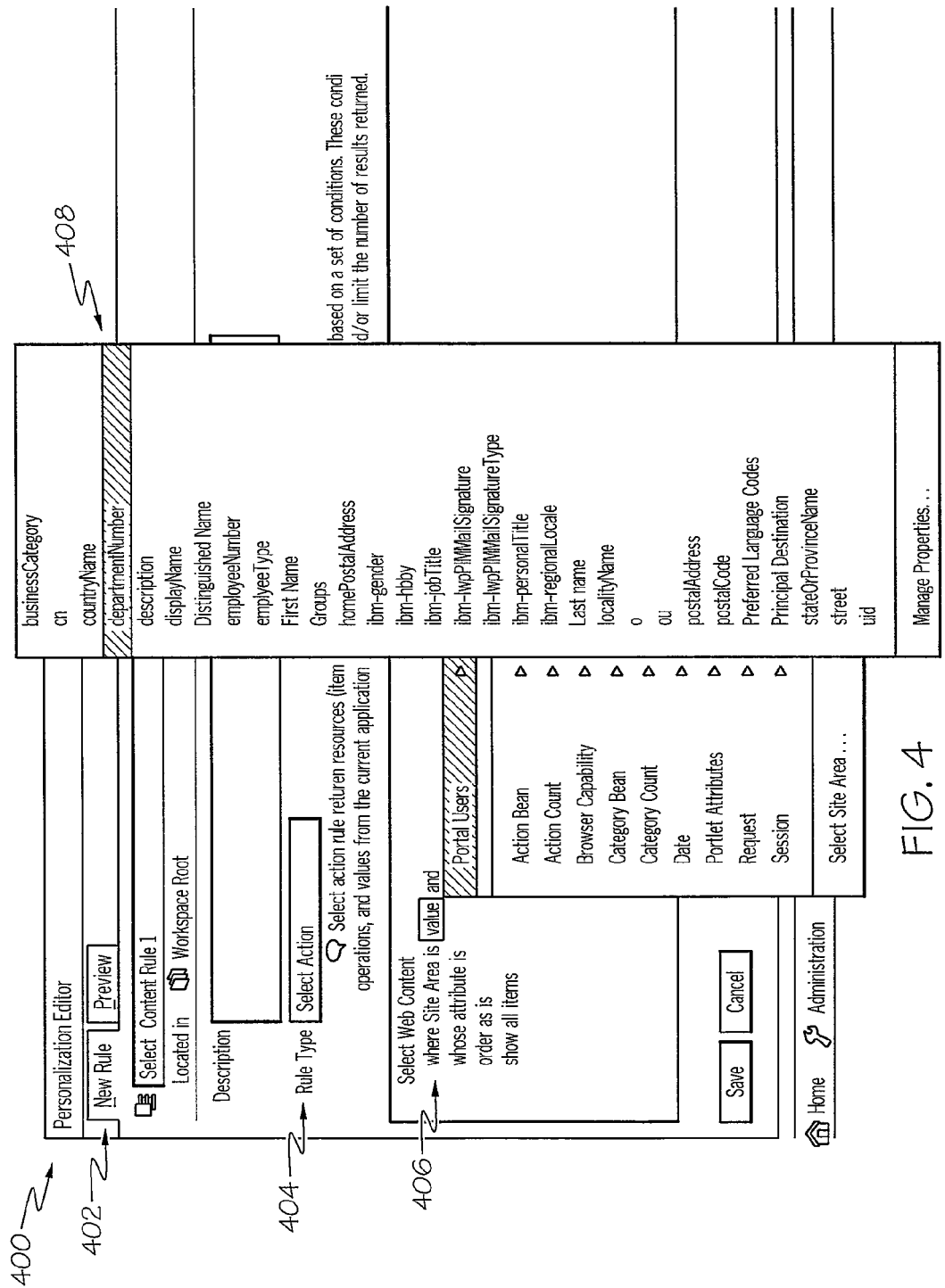
FIG. 4 illustrates a GUI representative of block 214 in FIG. 2, demonstrating which elements are customized according to the business vocabulary context.

With reference now to FIG. 4, additional detail is provided for creating a new rule. A GUI 400 for a personalization rule editor shows that a tab 402 has been selected to create a new rule. In the example shown in FIG. 4, a call to a rule type, shown in drop-down men, 404, shows that the context for the rule allows the business user to only perform four actions: Select Action; Binding; Update Action; and Recommend Action. These action options are filtered according to contexts previously defined and allowed by the application developer. By selecting the "Select Action" option, the business user is able to define a new rule to select content where the site area 406 of the content matches the department name 408 of the user. In this example, the rule will be executed from the context of a web content management system, so the web content management system has passed the tag a business vocabulary context, described by a category, which references the user and content metadata which will be available when the rule is executed. Thus, multiple filtering layers allow the business user to choose rules that are 1) logical for the application (as determined by the application developer) and are 2) permitted by the application developer (e.g., in accordance with objects that will be available at the time the rule is invoked and rule types, which may determine the rule's output type, expected by the application, etc.)

Figure 5:
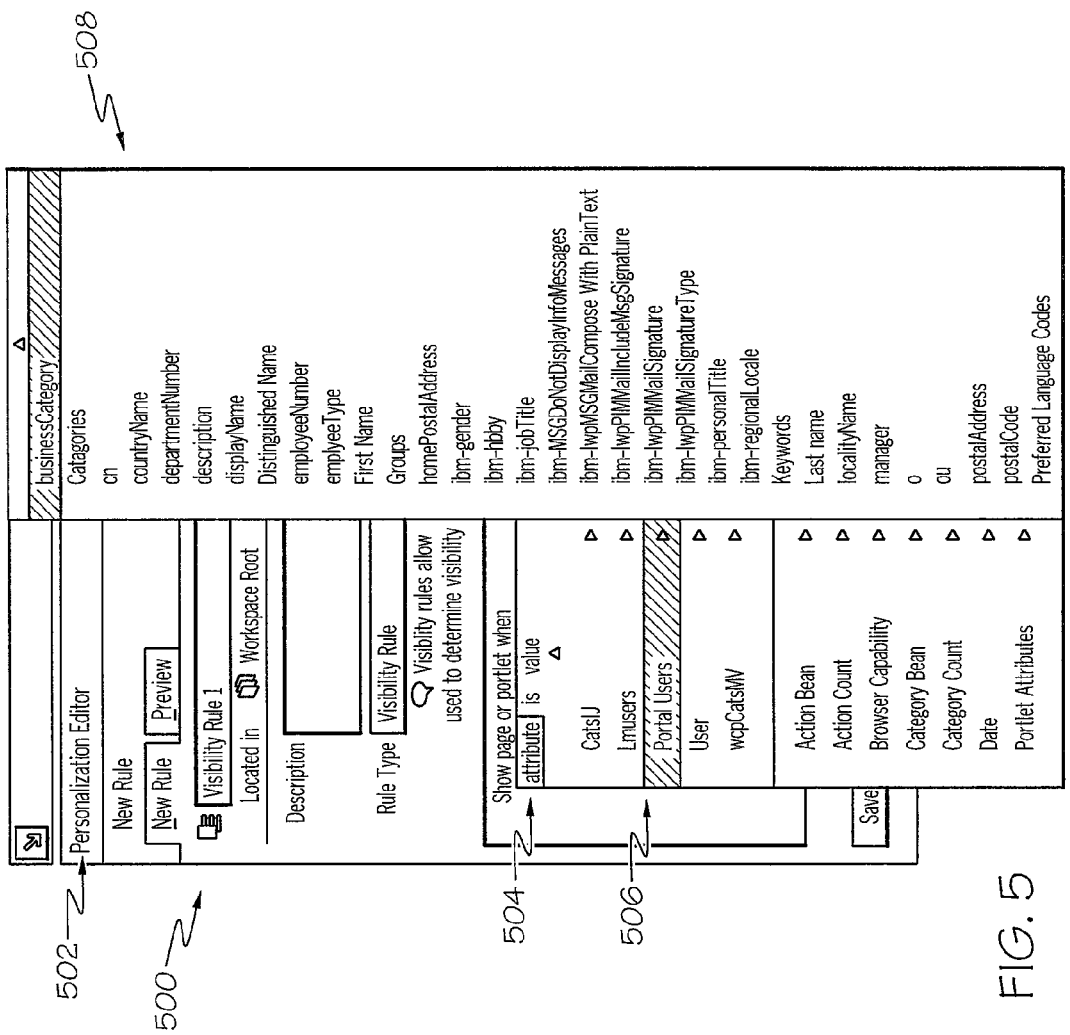
FIG. 5 depicts a GUI which shows additional options available when creating a new rule which also respond to the business vocabulary context.

Referring now to FIG. 5, additional detail is shown for a more expansive (less filtered) array of options available to a business user when creating a new rule for an application. The GUI 500 is accessed through a "create new rule" link on a drop down menu previously discussed), or a "new" button in a "select a rule" page. The rule "Show page or portlet when", shown in personalization picker 502, is part of a rule syntax. "Visibility Rule" is the rule type. In the example shown in FIG. 5, the caller has passed in a "business vocabulary context" which allows certain objects to be displayed in a rule editor and certain rule types. A "business vocabulary context" is a category that is passed to the preexisting application when calling a picker. For example, in the case of a word processing application, "author," "date" and "subject" are examples of objects that make up a business vocabulary. A "business vocabulary context" is the business vocabulary combined with a current application/system context (current user, system name, conditional register contents in a computer system, etc).

In GUI 500, the business user has clicked on the "attribute" link 504, which resulted in the menu 506, which has been filtered by criteria set by the application developer. The business user, in the example shown, has clicked the "Portal Users" option, resulting in a secondary menu 508 displaying one or more options that may be selected by the business user under the "Portal Users" feature. Thus, menus 506 and 508 are filtered according to objects included in the business vocabulary context. Note that this is one place in which lists filtered by the business vocabulary context appear. Rule editing may also involve the building of constraints between different constants and variables, or selecting or inputing constants and variables to complete a form. Thus, the business vocabulary context limits the selection or variables to only those appropriate for the calling application wherever such variables can be referenced in the rules.

Figure 6:
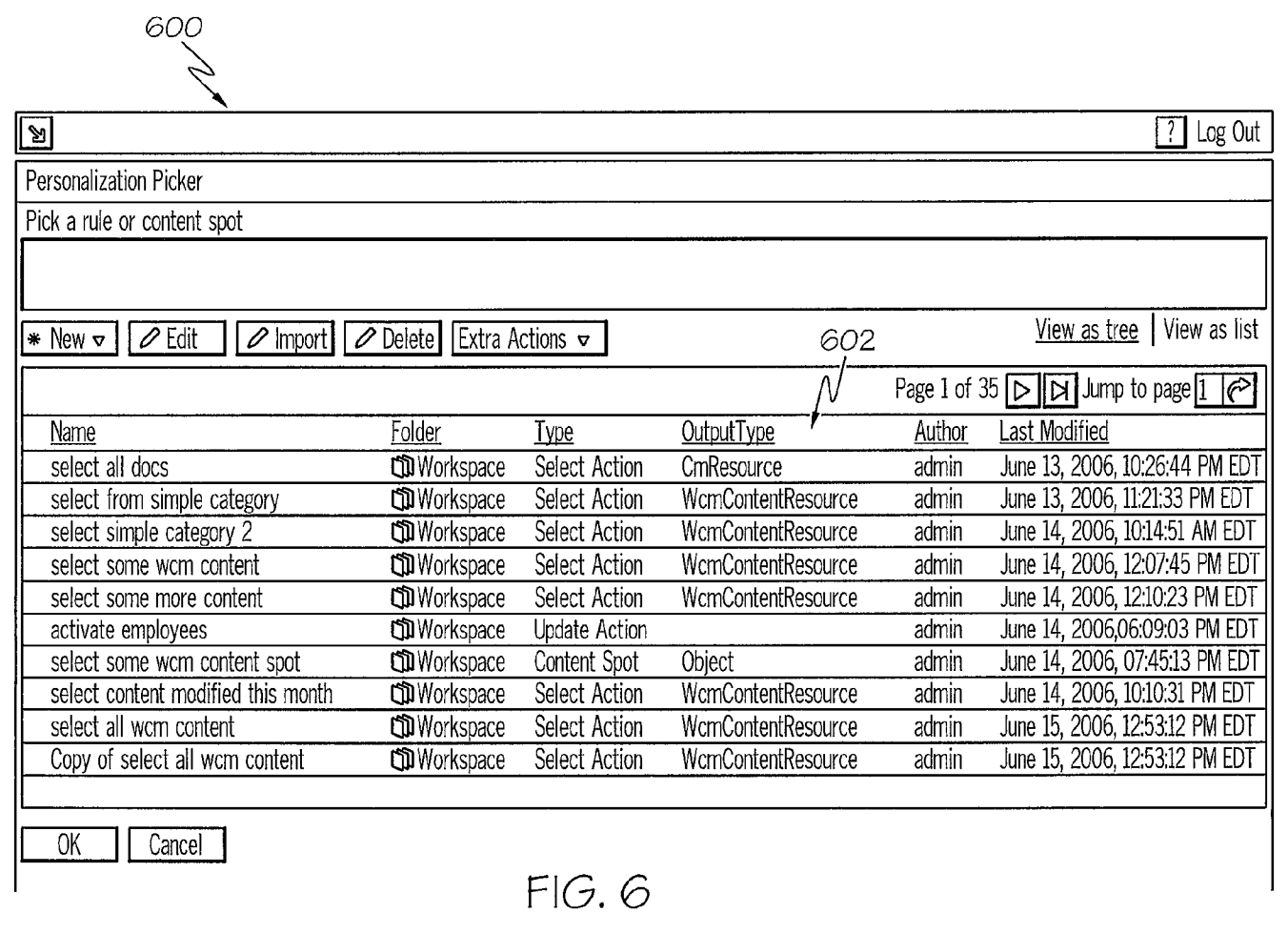

Referring now to FIG. 6, a GUI 600 is presented to a business user for selecting an existing rule. One or more rules are selected from the listing of rules 602 shown. All shown rules return content or are update rules. Once a rule is selected, clicking the "OK" button returns the business user to the previous page (e.g., the GUI 300 shown in FIG. 3). Clicking "Cancel" allows the business user to return to the previous page without selecting a rule. Thus, GUI 600 allows the business user to select a rule that is accessed from the "Select Rule" option in the rule menu, or a "Search" button when using a Uniform Resource Locator (URL) generation API described below in FIG. 8. The rules displayed in GUI 600 are filtered according to the "business vocabulary" options set by the application developer. Rules that use terms or are of a rule type that are not included in the "business vocabulary context" are filtered out, and are not displayed to the business user. GUI 600 allows all actions that can be performed on rules from a rule administration page, including edit rule, import/export rule, publish rule, version rule, set rule permission levels, and create new rules without leaving the currently executing application. All rule capabilities are effectively embedded in the calling application (in the example in FIG. 3, the edit layout page). The rules may optionally be displayed in a tree format, as shown in GUI 700 in FIG. 7.

Note further that, as shown by GUI 800 in FIG. 8, a rule picker tag may use a link buttons for URL's of pages in which rules may be accessed. A URL generation API, which is activated by selecting an appropriate box in area 802, allows the application developer more options for customization by the display of links to the appropriate rule pages.

Figure 9:
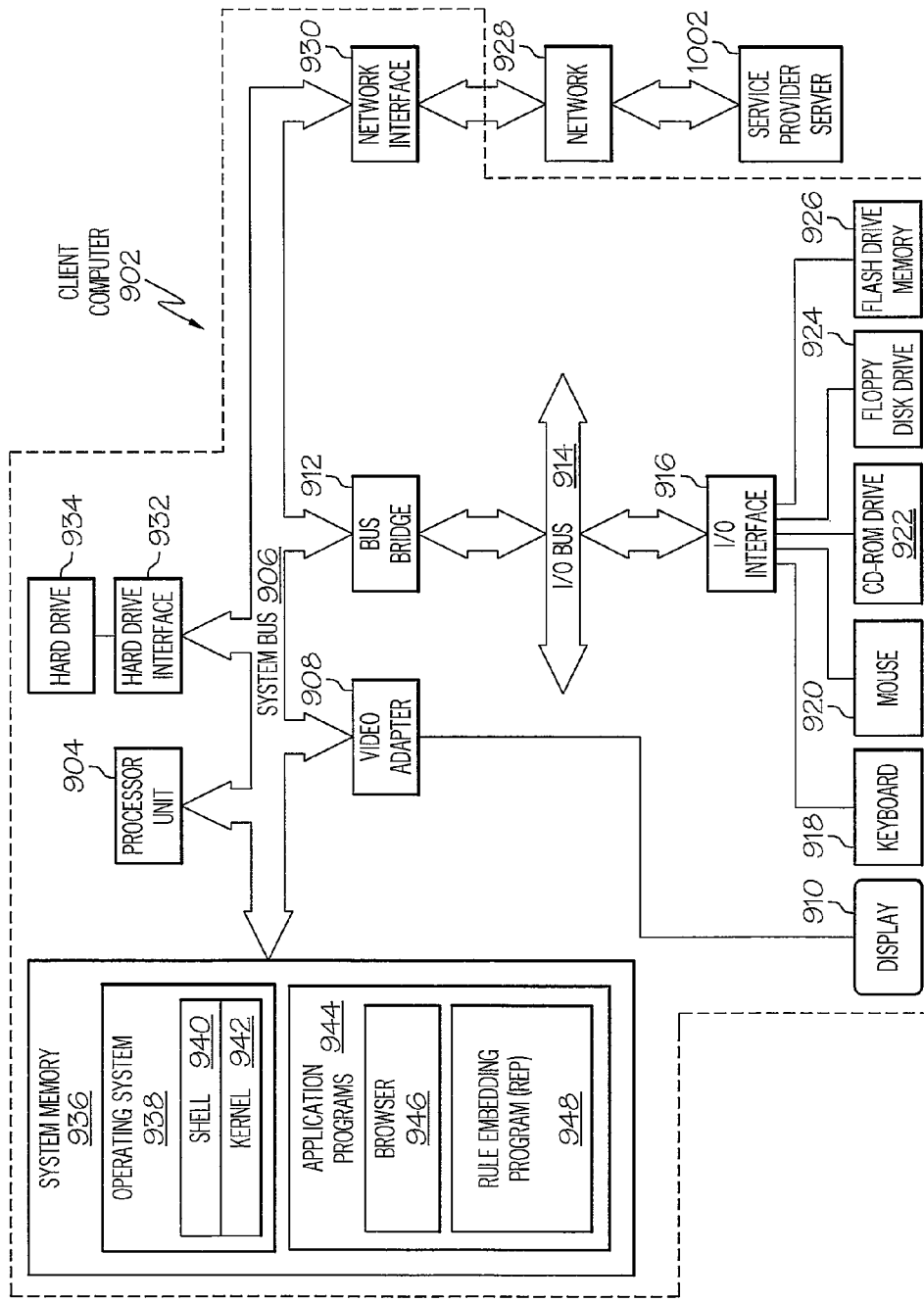
FIG. 9 depicts an exemplary client computer in which the present invention may implemented.

With reference now to FIG. 9, there is depicted a block diagram of an exemplary client computer 902, in which the present invention may be utilized. Client computer 902 includes a processor unit 904 that is coupled to a system bus 906. A video adapter 908, which drives/supports a display 910, is also coupled to system bus 906. System bus 906 is coupled via a bus bridge 912 to an Input/Output (I/O) bus 914. An I/O interface 916 is coupled to I/O bus 914. I/O interface 916 affords communication with various I/O devices, including a keyboard 918, a mouse 920, a Compact Disk-Read Only Memory (CD-ROM) drive 922, a floppy disk drive 924, and a flash drive memory 926. The format of the ports connected to I/O interface 916 may be any known to those skilled in the art of computer architecture, including but not limited to Universal Serial Bus (USB) ports.

Client computer 902 is able to communicate with a service provider server 1002 via a network 928 using a network interface 930, which is coupled to system bus 906. Network 928 may be an external network such as the Internet, or an internal network such as an Ethernet or a Virtual Private Network (VPN). Using network 928, client computer 902 is able to use the present invention to access service provider server 1002.

A hard drive interface 932 is also coupled to system bus 906. Hard drive interface 932 interfaces with a hard drive 934. In a preferred embodiment, hard drive 934 populates a system memory 936, which is also coupled to system bus 906. System memory is defined as a lowest level of volatile memory in client computer 902. This volatile memory may include additional levels of volatile memory (not shown), including but not limited to cache memory, registers and buffers. Data that populates system memory 936 includes client computer 902's operating system (OS) 938 and application programs 944.

OS 938 includes a shell 940, for providing transparent user access to resources such as application programs 944. Generally, shell 940 is a program that provides an interpreter and an interface between the user and the operating system. More specifically, shell 940 executes commands that are entered into a command line user interface or from a file. Thus, shell 940 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 942) for processing. Note that while shell 940 is a text-based, line-oriented user interface, the present invention will equally well support other user interface modes, such as graphical, voice, gestural, etc.

As depicted, OS 938 also includes kernel 942, which includes lower levels of functionality for OS 938, including providing essential services required by other parts of OS 938 and application programs 944, including memory management, process and task management, disk management, and mouse and keyboard management.

Application programs 944 include a browser 946. Browser 946 includes program modules and instructions enabling a World Wide Web (WWW) client (i.e., client computer 902) to send and receive network messages to the Internet using HyperText Transfer Protocol (HTTP) messaging, thus enabling communication with service provider server 1002.

Application programs 944 in client computer 902's system memory also include a Rule Embedding Program (REP) 948, which includes code for implementing the processes described in FIGS. 1-8. In one embodiment, REP 948 is resident on service provider server 1002, such that client computer 902 is able to download REP 948 from service provider server 1002, preferably through the use of browser 946.

The hardware elements depicted in client computer 902 are not intended to be exhaustive, but rather are representative to highlight essential components required by the present invention. For instance, client computer 902 may include alternate memory storage devices such as magnetic cassettes, Digital Versatile Disks (DVDs), Bernoulli cartridges, and the like. These and other variations are intended to be within the spirit and scope of the present invention.

Figure 10:
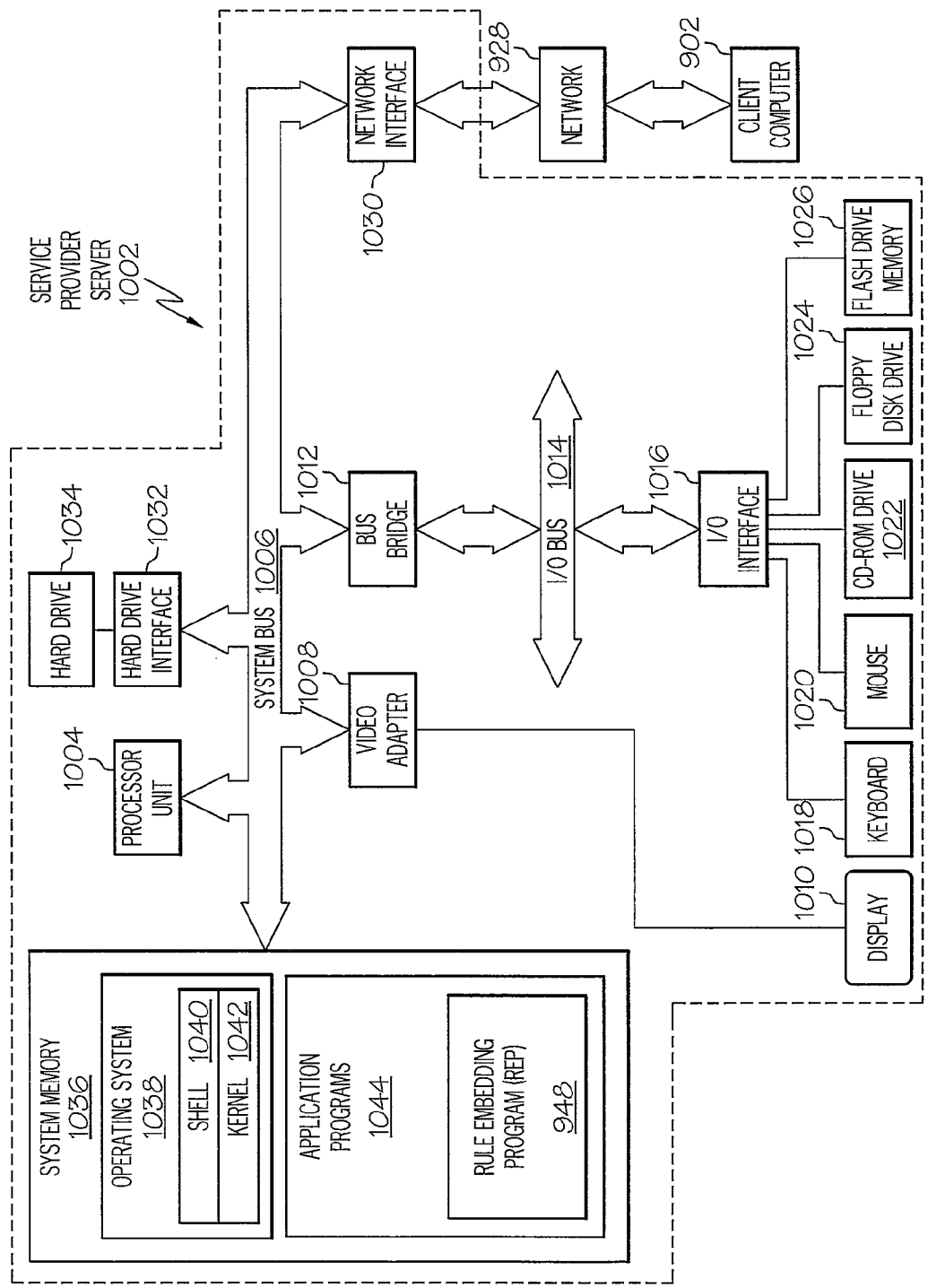
FIG. 10 illustrates an exemplary server from which software for executing the present invention may be deployed and/or implemented for the benefit of a user of the client computer shown in FIG. 9.

As noted above, REP 948 can be downloaded to client computer 902 from service provider server 1002, shown in exemplary form in FIG. 10. Service provider server 1002 includes a processor unit 1004 that is coupled to a system bus 1006. A video adapter 1008 is also coupled to system bus 1006. Video adapter 1008 drives/supports a display 1010. System bus 1006 is coupled via a bus bridge 1012 to an Input/Output (I/O) bus 1014. An I/O interface 1016 is coupled to I/O bus 1014. I/O interface 1016 affords communication with various I/O devices, including a keyboard 1018, a mouse 1020, a Compact Disk-Read Only Memory (CD-ROM) drive 1022, a floppy disk drive 1024, and a flash drive memory 1026. The format of the ports connected to I/O interface 1016 may be any known to those skilled in the art of computer architecture, including but not limited to Universal Serial Bus (USB) ports.

Service provider server 1002 is able to communicate with client computer 902 via network 928 using a network interface 1030, which is coupled to system bus 1006. Access to network 928 allows service provider server 1002 to execute and/or download REP 948 to client computer 902.

System bus 1006 is also coupled to a hard drive interface 1032, which interfaces with a hard drive 1034. In a preferred embodiment, hard drive 1034 populates a system memory 1036, which is also coupled to system bus 1006. Data that populates system memory 1036 includes service provider server 1002's operating system 1038, which includes a shell 1040 and a kernel 1042. Shell 1040 is incorporated in a higher level operating system layer and utilized for providing transparent user access to resources such as application programs 1044, which include a copy of REP 948 described above, which can be deployed to client computer 902.

The hardware elements depicted in service provider server 1002 are not intended to be exhaustive, but rather are representative to highlight essential components required by the present invention. For instance, service provider server 1002 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 1002 performs all of the functions associated with the present invention (including execution of REP 948), thus freeing client computer 902 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of REP 948, are performed by service provider server 1002. Alternatively, REP 948 and the method described herein, and in particular as shown and described in FIGS. 1-8, can be deployed as a process software from service provider server 1002 to client computer 902. Still more particularly, process software for the method so described may be deployed to service provider server 1002 by another service provider server (not shown).

Figure 11A:
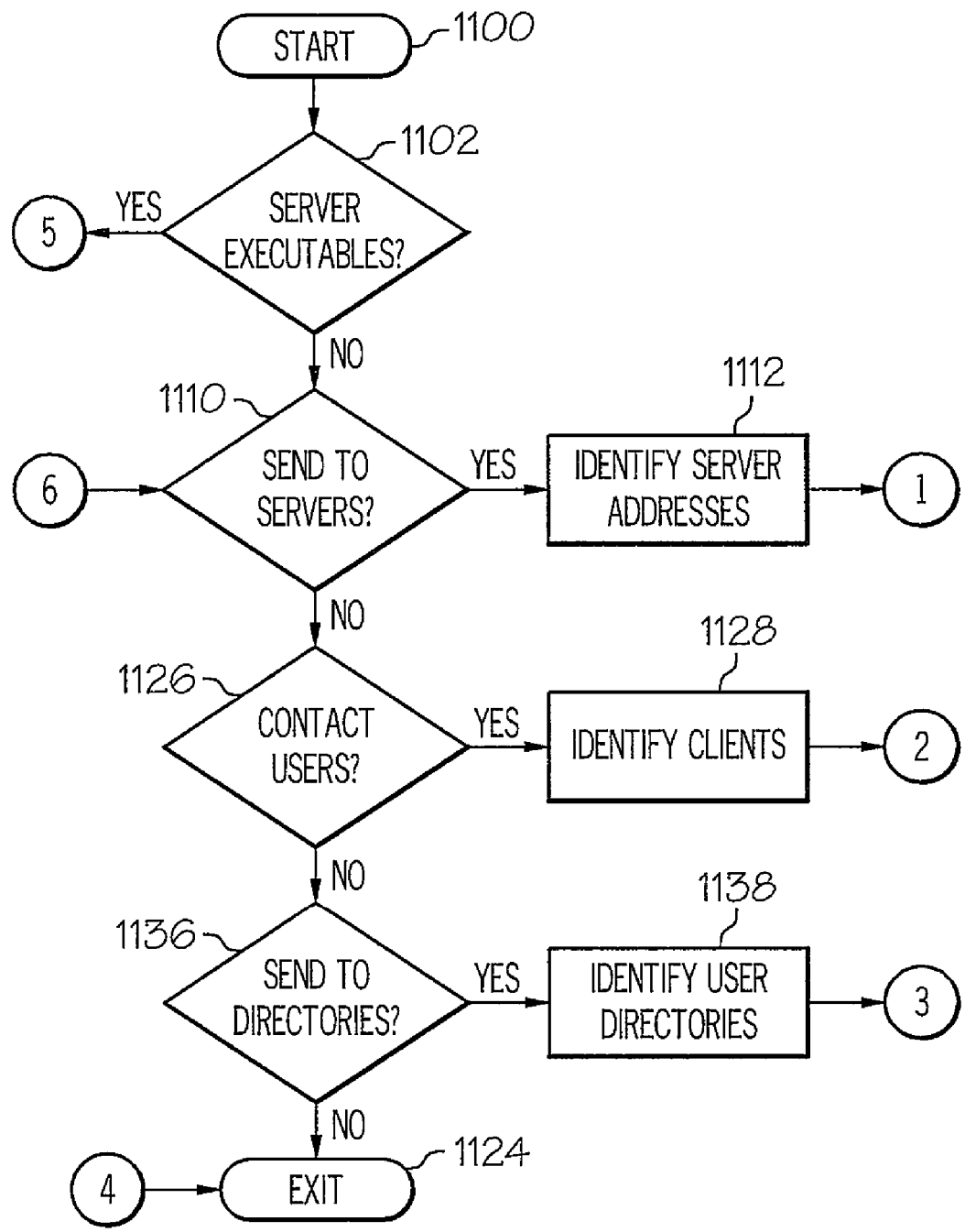
FIGS. 11a-b show a flow-chart of steps taken to deploy software capable of executing the steps shown and described in FIGS. 1-8.
Figure 11B:
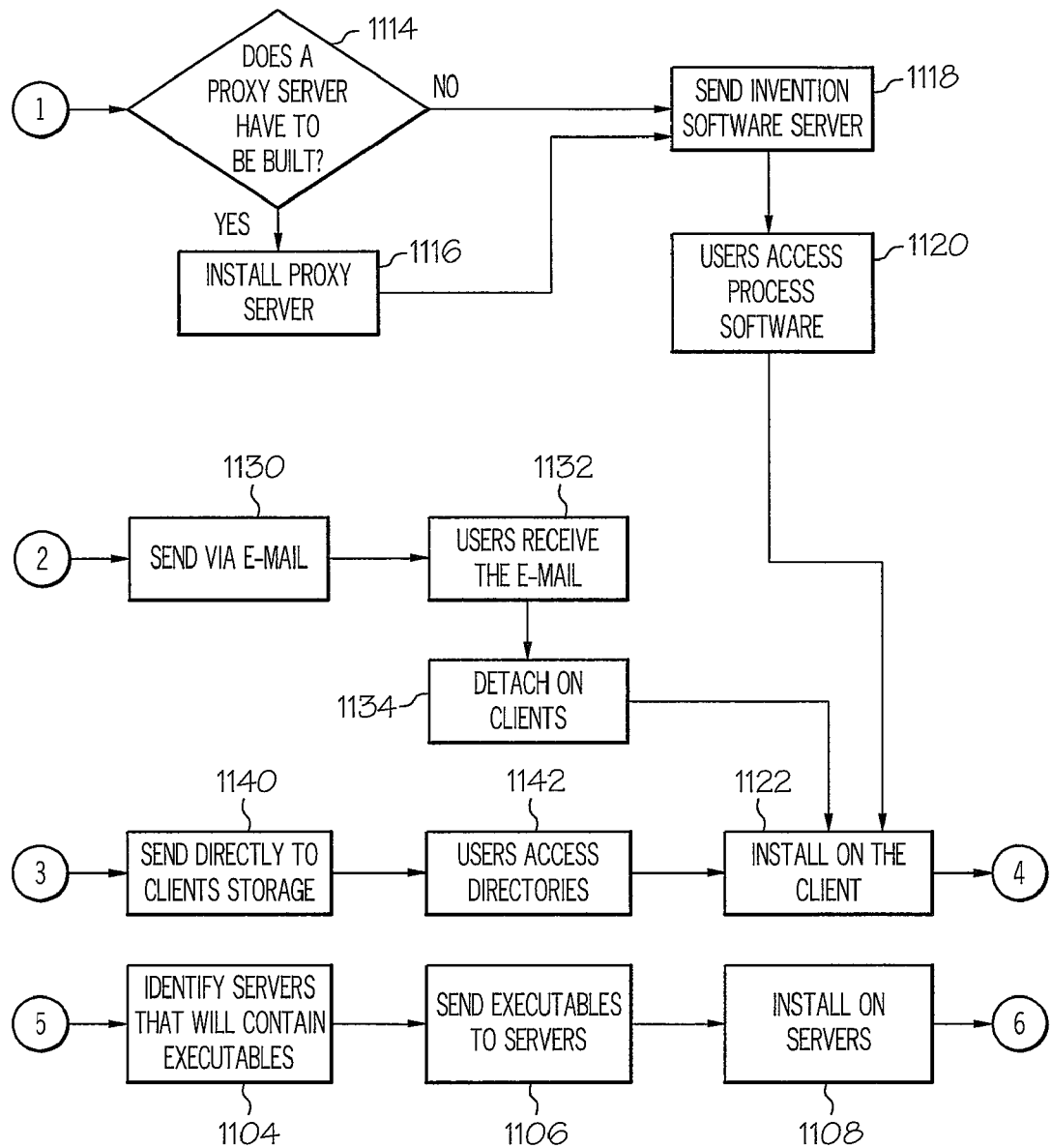

Referring then to FIGS. 11a-b, step 1100 begins the deployment of the process software. The first thing is to determine if there are any programs that will reside on a server or servers when the process software is executed (query block 1102). If this is the case, then the servers that will contain the executables are identified (block 1104). The process software for the server or servers is transferred directly to the servers' storage via File Transfer Protocol (FTP) or some other protocol or by copying though the use of a shared file system (block 1106). The process software is then installed on the servers (block 1108).

Next, a determination is made on whether the process software is to be deployed by having users access the process software on a server or servers (query block 1110). If the users are to access the process software on servers, then the server addresses that will store the process software are identified (block 1112).

A determination is made if a proxy server is to be built (query block 1114) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 1116). The process software is sent to the servers either via a protocol such as FTP or it is copied directly from the source files to the server files via file sharing (block 1118). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 1120). Another embodiment is to have the servers automatically copy the process software to each client and then run the installation program for the process software at each client computer. The user executes the program that installs the process software on his client computer (block 1122) then exits the process (terminator block 1124).

In query step 1126, a determination is made whether the process software is to be deployed by sending the process software to users via e-mail. The set of users where the process software will be deployed are identified together with the addresses of the user client computers (block 1128). The process software is sent via e-mail to each of the users' client computers (block 1130). The users then receive the e-mail (block 1132) and then detach the process software from the e-mail to a directory on their client computers (block 1134). The user executes the program that installs the process software on his client computer (block 1122) then exits the process (terminator block 1124).

Lastly a determination is made as to whether the process software will be sent directly to user directories on their client computers (query block 1136). If so, the user directories are identified (block 1138). The process software is transferred directly to the user's client computer directory (block 1140). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 1142). The user executes the program that installs the process software on his client computer (block 1122) and then exits the process (terminator block 1124).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called runnel interfaces, where the packet enters and exits the network.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 12A:
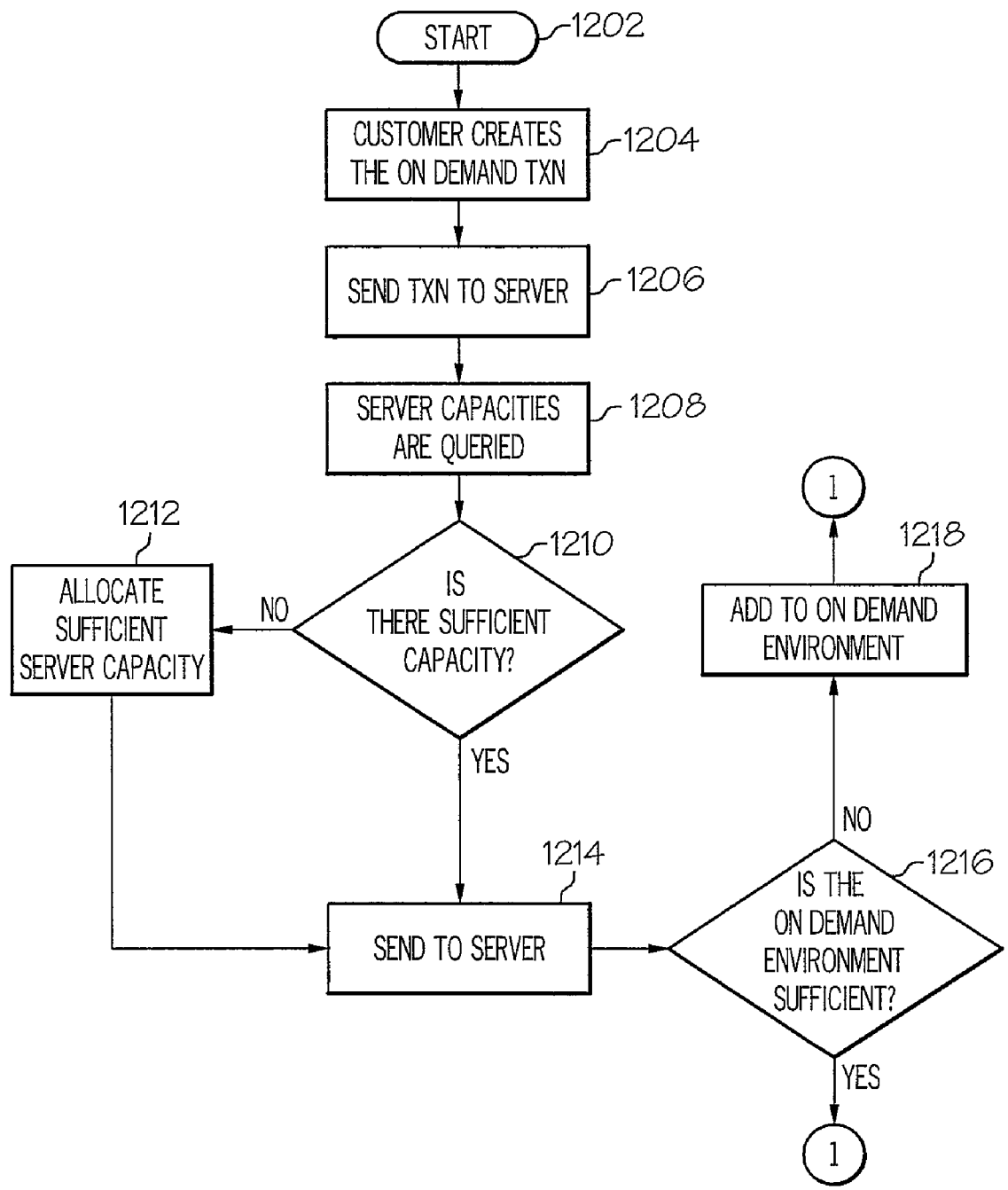
FIGS. 12a-b show a flow-chart showing steps taken to execute the steps shown and described in FIGS. 1-8 using an on-demand service provider.
Figure 12B:
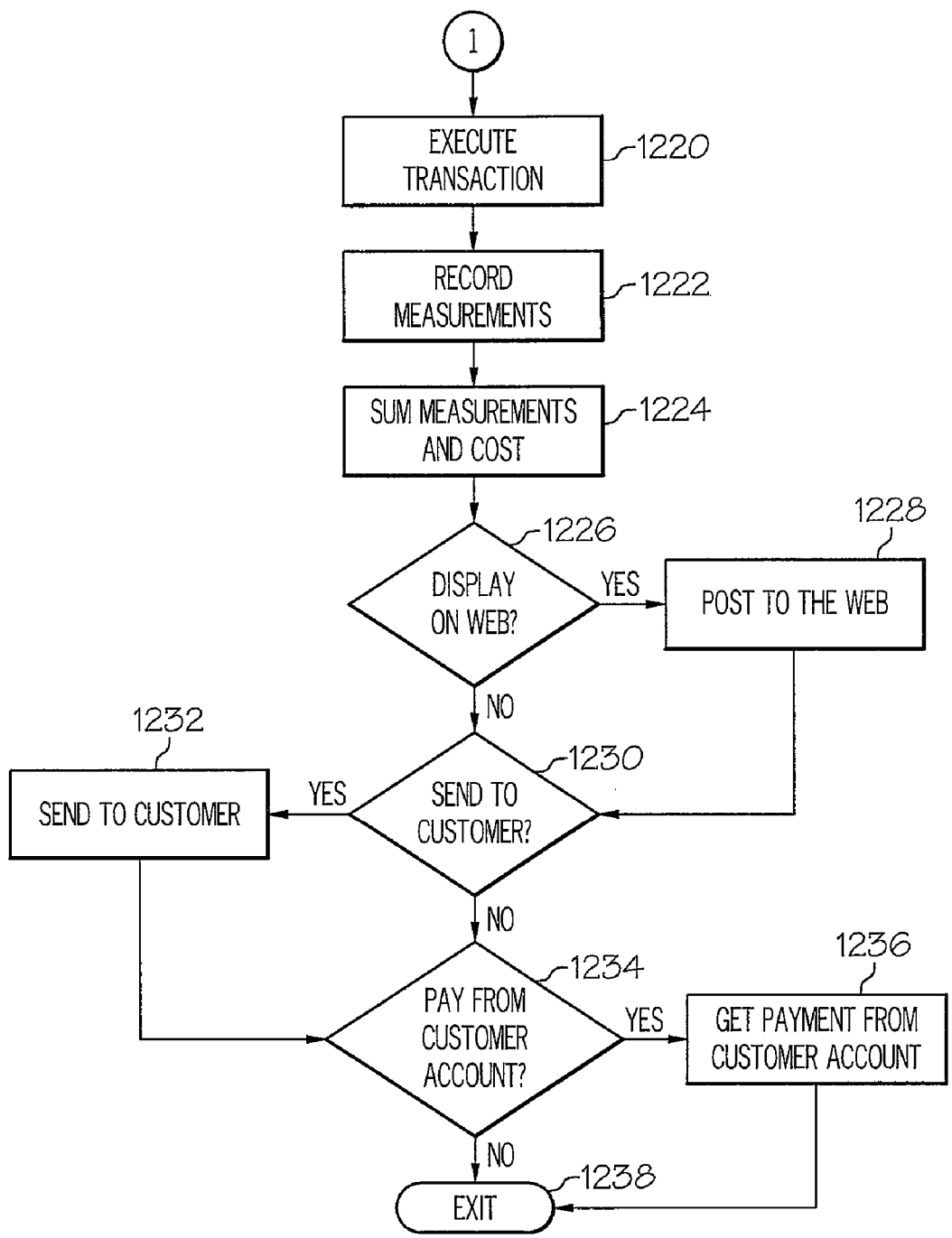

With reference now to FIGS. 12a-b, initiator block 1202 begins the On Demand process. A transaction is created than contains the unique customer identification, the requested service type and any service parameters that further, specify the type of service (block 1204). The transaction is then sent to the main server (block 1206). In an On Demand environment the main server can initially be the only server, then as capacity is consumed other servers are added to the On Demand environment.

The server central processing unit (CPU) capacities in the On Demand environment are queried (block 1208). The CPU requirement of the transaction is estimated, then the servers available CPU capacity in the On Demand environment are compared to the transaction CPU requirement to see if there is sufficient CPU available capacity in any server to process the transaction (query block 1210). If there is not sufficient server CPU available capacity, then additional server CPU capacity is allocated to process the transaction (block 1212). If there was already sufficient Available CPU capacity then the transaction is sent to a selected server (block 1214).

Before executing the transaction, a check is made of the remaining On Demand environment to determine if the environment has sufficient available capacity for processing the transaction. This environment capacity consists of such things as but not limited to network bandwidth, processor memory, storage etc. (block 1216). If there is not sufficient available capacity, then capacity will be added to the On Demand environment (block 1218). Next the required software to process the transaction is accessed, loaded into memory, then the transaction is executed (block 1220).

The usage measurements are recorded (block 1222). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 1224).

If the customer has requested that the On Demand costs be posted to a web site (query block 1226), then they are posted (block 1228). If the customer has requested that the On Demand costs be sent via e-mail to a customer address (query block 1230), then these costs are sent to the customer (block 1232). If the customer has requested that the On Demand costs be paid directly from a customer account (query block 1234), then payment is received directly from the customer account (block 1236). The On Demand process is then exited at terminator block 1238.

The present invention thus provides a tag which applications can use to integrate rule capabilities. Exemplary actions that are available from a rendering of the tag include: Create New Rule; Select Rule; Edit Rule and Deselect Rule. "Create New Rule" and "Edit Rule" are only available if the user has write access to the rules repository. "Select Rule" is only available if the user has read access to the rules repository. The "Deselect Rule" option is only available if a rule has been selected already.

A selected rule may be passed to an existing application via a tag. The tag allows for three modes: inline, pop-up, and floating iframe or div. For the inline mode, a portlet action is used to send notification that a rule has been selected. The name of the action to send is specified as a parameter to the tag. In this way, multiple rule pickers can be used in the same page and the calling portlet can distinguish in which picker a selection was made. A token representing the selected rule is sent on a request parameter along with the portlet action. For the pop-up and floating iframe modes, the selection is communicated back to the application using a Javascript callback. This Javascript callback approach is used in other picker implementations including the Portal Document Picker. The Javascript function name is specified as a parameter to the tag similarly to the portlet action name.

Since the calling application maintains the rule mapping, the tag also allows the application to specify through a tag parameter what the currently selected rule is. This enables the "edit rule" capability, as well as allowing the picker to preselect the currently selected rule when selecting another rule, and to show a display name of the currently selected rule next to the rendering of the picker menu.

The tag also allows the application to specify "business vocabulary". Business vocabulary is the set of objects and terms that can be used in the rule editor. For instance, a mail application would include business vocabulary for a mail document and possibly vocabulary for users such as sender so rules could be written based on attributes of the mail document and attributes of the sender. For instance, "move to folder 'Mail from Managers' when sender is a manager". Here, "move to" is an action defined in the business vocabulary. 'Sender' and 'a manager' are terms defined in the business vocabulary, and "when" and "is" are part of the syntax of the rule. Elements of the business vocabulary define where they may appear in the rule syntax. The "sender" business vocabulary item declares that it may be a subject of the rule and is a person. 'A manager' declares that it is a type of person.

The application may specify a set of ids and category ids for business vocabulary. All business vocabulary items in the designated categories or with the specified ids are allowed in the rule editors. The use of an embeddable rule editor allowing for business vocabulary customized by the caller is novel. As defined above, the set of allowed business vocabulary is referred to as "business vocabulary context." The category may be defined to be exclusive or inclusive. In the exclusive case, all business vocabulary except that in the category is available to the rule editor. In the inclusive case, only business vocabulary in the category will be available to the rule editor. In the case where a business vocabulary context is specified on a call to the rule picker tag, rules which use business vocabulary not in the specified business vocabulary context are not available. Such rules will be referred to as "out of context" and are filtered from the list of rules when selecting a rule and creation of such a rule is not allowed when creating a new rule or editing a rule in that picker.

The invention provides for a "show all" toggle button in rule picker User Interface (UI). Selecting this option will show all rules, even those out of context. The invention may or may not allow selection of them depending on a configuration option. This override is useful in case the rule editor knows more about the execution environment of the rule than the calling application, which is not generally the case. Rules which are out of context will be displayed in grey text instead of black to indicate they are not available. Hovering over a rule will display what business vocabulary caused this rule to be out of context. The user can troubleshoot the problem of a particular rule not being available when it is believed the rule should be available as might be the case when a rule editor is unaware of a dependency a rule has on some particular business vocabulary.

In a portal administration application, rules may be assigned to pages and portlets to define when those pages and portlets are visible. Only certain business vocabulary is accessible in this context. For instance, there is no current piece of web content, so a "web content" resource is not available. The same rule editor and rule picker are used in Web Content Management, but here there may be a current piece of web content being acted on, so the rule may use a "web content" object in this context. In a policy application, the rule might depend on a teamspace which is being managed. In this case, attributes of the teamspace should be available to the rule editor. Attributes of a teamspace will not make sense inside a Portal Administration or Web Content rule though. Rules which update the user are not valid in Portal Administration. The only valid rule type is a rule type which return true or false (to decide whether to show or hide the portlet or page).

To invoke a rule from a picker, the rule engine provides an API to execute a rule identified by the token passed back from the rule picker. These functions together provide a novel way of integrating a generic rules engine, rule editor and rule picker into varied applications on the same platform, while maximizing reuse of common rules.

Note further that, as described above, instructions used in each embodiment of a computer-usable medium may be deployed from a service provider to a user. This deployment may be made in an "on-demand" basis as described herein.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implemented method comprising:
imbedding a rule picker into an existing software application;
a processor presenting a choice of rules to be implemented in the existing software application, wherein a business vocabulary context is a set of terms and objects available at a time in which the rules will be executed, wherein the business vocabulary context defines and limits the choice of rules that is presented as an option for creating a new rule, and wherein the choice of rules is presented to a user; and
the processor integrating a user-selected rule, from the choice of rules, into the existing software application, wherein the user-selected rule causes the existing software application to be modified when the user-selected rule is implemented in the existing software application.

2. The computer-implemented method of claim 1, wherein potential objects and terms for a business vocabulary context are categorized, and wherein a specific business vocabulary context is represented by a category to determine which choice of rules is presented to a particular user.

3. The computer-implemented method of claim 1, further comprising:
the processor identifying which business vocabulary terms are authorized for the user;
the processor identifying out of context rules as rules that use business vocabulary terms that are not authorized for the user; and
the processor displaying the out of context rules in a color-coded text to indicate that the out of context rules are unavailable to the user.

4. The computer-implemented method of claim 1, wherein the business vocabulary context is determined by a business vocabulary of the existing software application, wherein the business vocabulary is composed of software objects that describe a current session of the existing software application.

5. The computer-implemented method of claim 2, further comprising:
creating a new rule that comports with the business vocabulary context in the existing software application.

6. The computer-implemented method of claim 5, further comprising:
categorizing the new rule as a categorized new rule; and
storing the categorized new rule in a rule repository that is accessible to the existing software application.

7. The computer-implemented method of claim 1, wherein the business vocabulary context is a name of a category that is passed to a rule creation engine by a rule picker in an Integrated Development Environment (IDE).

8. The computer-implemented method of claim 7, further comprising:
rendering a rule picker tag in the IDE, wherein the rule picker tag presents an option to create a new rule, and wherein the rule picker tag is a Java Server Page (JSP) tag found in a JSP file that rendered the existing software application in the IDE; and
the processor executing the JSP tag to render a link to a page that contains the user-selected rule.

9. A system comprising:
a processor;
a data bus coupled to the processor;
a memory coupled to the data bus; and
a non-transitory computer-usable medium embodying computer program code, the computer program code comprising instructions executable by the processor and configured for:
imbedding a rule picker into an existing software application;
presenting a choice of rules to be implemented in the existing software application, wherein a business vocabulary context defines and limits the choice of rules that is presented, and wherein the choice of rules is presented to a user; and
integrating a user-selected rule, from the choice of rules, into the existing software application, wherein the user-selected rule causes the existing software application to be modified when the user-selected rule is implemented in the existing software application.

10. The system of claim 9, wherein the business vocabulary context is determined by a business vocabulary of the existing software application, wherein the business vocabulary is composed of software objects that describe a current session of the existing software application.

11. The system of claim 10, wherein the instructions are further configured for:
creating a new rule that comports with the business vocabulary context in the existing software application.

12. The system of claim 11, wherein the instructions are further configured for:
categorizing the new rule as a categorized new rule; and
storing the categorized new rule in a rule repository that is accessible to the existing software application.

13. The system of claim 9, wherein the business vocabulary context is a name of a category that is passed to a rule creation engine by a rule picker in an Integrated Development Environment (IDE).

14. The system of claim 13, wherein the instructions are further configured for:
rendering a rule picker tag in the IDE, wherein the rule picker tag presents an option to create a new rule, and wherein the rule picker tag is a Java Server Page (JSP) tag found in a JSP file that rendered the existing software application in the IDE.

15. A non-transitory computer-usable medium embodying computer program code, the computer program code comprising computer executable instructions configured for:
imbedding a rule picker into an existing software application;
presenting a choice of rules to be implemented in the existing software application, wherein a business vocabulary context defines and limits the choice of rules that is presented, and wherein the choice of rules is presented to a user; and
integrating a user-selected rule, from the choice of rules, into the existing software application, wherein the user-selected rule causes the existing software application to be modified when the user-selected rule is implemented in the existing software application.

16. The non-transitory computer-usable medium of claim 15, wherein the business vocabulary context is determined by a business vocabulary of the existing software application, wherein the business vocabulary is composed of software objects that describe a current session of the existing software application.

17. The non-transitory computer-usable medium of claim 16, wherein the computer executable instructions are further configured for:
creating a new rule that comports with the business vocabulary context in the existing software application.

18. The non-transitory computer-usable medium of claim 17, wherein the computer executable instructions are further configured for:
categorizing the new rule as a categorized new rule; and
storing the categorized new rule in a rule repository that is accessible to the existing software application.

19. The non-transitory computer-useable medium of claim 15, wherein the computer-usable medium is a component of a remote server, and wherein the computer executable instructions are deployable to a client computer from the remote server.

20. The non-transitory computer-useable medium of claim 15, wherein the computer executable instructions are capable of being provided by a service provider to a customer on an on-demand basis.

* * * * *